United States Patent [19]

Morton

[11] Patent Number: 4,459,065

[45] Date of Patent: Jul. 10, 1984

[54] SUBSEA WINCHING APPARATUS AND METHOD

[75] Inventor: Arthur W. Morton, Houston, Tex.

[73] Assignee: Conoco Inc., Ponca City, Okla.

[21] Appl. No.: 306,035

[22] Filed: Sep. 28, 1981

Related U.S. Application Data

[63] Continuation-in-part of Ser. No. 258,912, Apr. 30, 1981.

[51] Int. Cl.³ .................................................. F16L 1/04
[52] U.S. Cl. .................................... 405/169; 166/343; 166/347; 405/171
[58] Field of Search ............... 405/158, 169, 170, 171, 405/173, 185, 188, 190, 191; 166/342, 343, 344, 347

[56] References Cited

U.S. PATENT DOCUMENTS

| | | | |
|---|---|---|---|
| 3,293,867 | 12/1966 | Dean | 405/169 |
| 3,530,680 | 9/1970 | Gardner | |
| 3,698,348 | 10/1972 | Morgan | |
| 3,973,625 | 8/1976 | Baugh | 166/343 |
| 4,041,719 | 8/1977 | Baugh | 405/169 |
| 4,075,862 | 2/1978 | Ames | |
| 4,107,933 | 8/1978 | Lamy | 405/171 |
| 4,145,909 | 3/1979 | Daughtry | |

OTHER PUBLICATIONS

Ocean Resources Engineering, Apr. 1978, "Laying Underwater Pipelines by Float and Chains Method".
Paper OIC 3074, "Second End Flowline Connection Without Length Adjustment", by S. Pras, 10th Annual OTC, 1978.
Offshore Engineer, Sep. 1978, pp. 28-31, "Murchison Gave Conoco Team Chance for Subsea System Innovations".
Petroleum Engineer International, Jan. 1979, pp. 28, 30, 32 and 34, "Satellite Wells Completed".
Brochure of Lockheed Petroleum Services Ltd., entitled "The LPS System".

Primary Examiner—David H. Corbin
Attorney, Agent, or Firm—Stephen A. Littlefield

[57] ABSTRACT

Methods and apparatus are provided for connecting a buoyant off-bottom flowline to a subsea structure.

21 Claims, 14 Drawing Figures

SUBSEA WINCHING APPARATUS AND METHOD

This is a continuation-in-part of application Ser. No. 258,912 filed Apr. 30, 1981.

BACKGROUND OF THE INVENTION

1. Field of the Invention

This invention relates generally to methods and apparatus for pulling a flowline to a subsea structure for making a connection between the flowline and the subsea structure.

2. Description of the Prior Art

Because an offshore oil production platform can be located at a remote distance from a well whose production is to be conveyed to the production platform or to which injection fluid is to be sent from the production platform, for example, it is necessary to extend a flowline through the sea between the well and the production platform. A flowline which can be used for this purpose and a method of towing the flowline into position between the well and the production platform are disclosed in my co-pending U.S. patent application Ser. No. 048,316 entitled Flow Line Bundle and Method of Towing Same, filed June 14, 1979.

Once the flowline, such as the one disclosed in my aformentioned patent application, is towed or otherwise placed in a position in the vicinity of the well and the production platform, the flowline must be connected at one end to the production platform and at the other end to the well so that the oil from the well can be conveyed to the production platform or injection fluid can be sent to the well from the production platform, for example. One method of making these connections is disclosed in my aforementioned co-pending application. This disclosed method calls for hauling one end of the flowline into a receiving module by means of a line extending downwardly from the surface structure of the production platform.

Other means for pulling ends of pipelines or the like into subsea structures have been disclosed. U.S. Pat. No. 4,075,862 to Ames discloses that downhaul cables are acoustically called up from subsea structures and attached to powered winches of two flowline mating vehicles attached to the ends of a flowline while the ends of the flowline are located on two ships. The flowline is then dropped into the sea and hauled down to the subsea structure by the powered winches. Umbilical power cords from the two winches are connected to the flowline mating vessels.

Pull-in cables attached to platform-mounted or buoyant winches are disclosed in each of the following publications:

*Ocean Resources Engineering*, April 1978, "Laying Underwater Pipeline by Float and Chains Method";

Paper OIC, 3074, "Second End Flowline Connection Without Length Adjustment," by S. Pras, 10th Annual OTC, 1978;

*Offshore Engineer*, September 1978, pp. 28–31, "Murchison Gave Conoco Team Chance For Subsea System Innovations";

*Petroleum Engineer International*, January 1979, pp. 28, 30, 32 and 34, "Satellite Wells Completed"; and U.S. Pat. No. 4,145,909 to Daughtry.

The pulling-in of ends of pipelines by buoyant winches is shown in U.S. Pat. No. 3,530,680 to Gardner and U.S. Pat. No. 3,698,348 to Morgan.

Because of the translations and rotations which a flow-line goes through in a subsea environment, pull-in cables used to connect the flowline with a subsea structure can become entangled. Additionally, heave compensation is necessary when pull-in cables from a surface vessel are used because of the surface movement of the sea. Therefore, there is the need for an apparatus and method which can be used with a flowline and which can pull the flowline into the subsea structure without being affected by surface conditions and entanglement of lines and without requiring heave compensation apparatus.

SUMMARY OF THE INVENTION

The present invention overcomes the above-noted and other difficulties encountered in pulling a flowline toward a subsea structure by providing a novel and improved apparatus and method for pulling a flowline to a subsea structure. The present invention does not require heave compensation and reduces, if not totally eliminates, the entanglement of pull-in cables which can occur with other devices. Additionally, the present invention is capable of providing large forces to overcome the translations and rotations of the flowline in the subsea environment.

One method of the present invention includes the constructing of a flowline to have a positive buoyancy and attaching to the flowline a plurality of downwardly depending weight means so that the flowline with the weight means is neutrally buoyant at a position above the ocean floor with the weight means engaging the ocean floor. First and second winches are attached to a single end of the flowline. The flowline is towed to an offshore site and placed with said end of the flowline near a subsea structure with the end of the flowline positioned above the ocean floor with the weight means engaging the ocean floor. First and second winch lines are connected between the subsea structure and the first and second winches. Then the first and second winch lines are retrieved by the first and second winches, thereby pulling the end of the flowline into engagement with the subsea structure. Related apparatus are also provided.

Therefore, from the foregoing, it is a general object of the present invention to provide a novel and improved apparatus and method for pulling a flowline to a subsea structure. Other and further objects, features and advantages of the present invention will be readily apparent to those skilled in the art when the following description of the preferred embodiments is read in conjunction with the accompanying drawings.

DETAILED DESCRIPTION OF THE PREFERRED EMBODIMENTS

Figure 1:
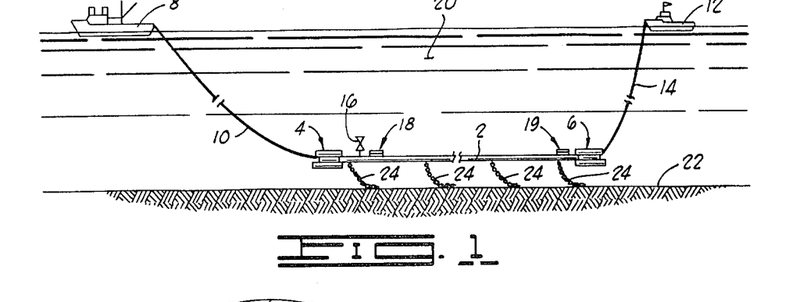
FIG. 1 is a schematic elevational view of a flowline bundle suspended a few feet above the ocean floor and towed between two vessels in an approximately catenary fashion.

With reference to the drawings, the preferred embodiments of the present invention will be described. FIG. 1 discloses a flowline bundle 2 connected to a lead flowline sled assembly 4 and to a trail flowline sled assembly 6. Connected between the leading end of the flowline bundle 2 and a tow vessel 8 is a flexible tow line 10. Connected between the trailing end of the flowline bundle 2 and a trailing vessel 12 is a flexible trailing line 14. Also connected to the flowline 2 are valve means 16 and subsea pull-in apparatus 18 and 19 constructed in accordance with the present invention.

When the flowline bundle 2 is towed through a body of water 20, it is desirable for the flowline bundle 2 to float either just above a floor 22 of the body of water 20 or at a controlled depth below the surface of the body of water 20 so that the flowline 2 will not be affected by the surface conditions of the water, for example. This is referred to as a buoyant off-bottom tow method and can be achieved by attaching a plurality of weight means 24 to the flowline bundle 2 to cause the flowline bundle to have a neutral buoyancy at a position above the sea floor 22 so that the weight means 24 partially engage the sea floor 22 as shown in FIG. 1. This is described in detail in my U.S. application Ser. No. 048,316.

Figure 2:
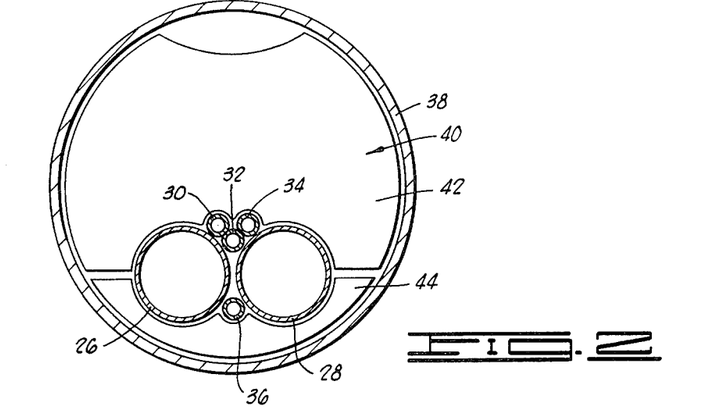
FIG. 2 is a cross-sectional view of a preferred embodiment flowline bundle.

FIG. 2 discloses a specific embodiment of the flowline 2 contemplated to be pulled in for connection to a subsea structure by the apparatus 18 or 19 of the present invention. The flowline bundle 2 shown in FIG. 2 is particularly described in my co-pending U.S. application Ser. No. 048,316 referred to hereinabove. The disclosure of this co-pending application is incorporated herein by reference. Briefly, however, the flowline 2 includes a plurality of fluid-conducting conduits 26, 28, 30, 32, 34 and 36. The conduits 26–36 are located within an outer tubular covering member 38. A polyurethane spacer, generally designated by the numeral 40, is connected about the conduits 26–36 and holds the same in a spaced relationship from an inner surface of the outer covering member 38. The spacer member 40 includes first and second spacer components 42 and 44 which are connected together by a plurality of bolts (not shown) or the like. A plurality of similar spacer members (not shown) are longitudinally spaced from spacer member 40 at suitable intervals along the lengths of the conduits 26–36.

By the method illustrated in FIG. 1 and disclosed in my aforementioned co-pending patent application, or another suitable method, the flowline 2 is moved to an offshore site and placed in a position extending between a well and a production platform which are the points between which the flowline 2 is to communicate a substance produced from the well or to be sent to the well. For example, assume a production operation includes a production platform having two satellite subsea wells for oil production and one satellite subsea well for water injection. A flowline bundle of the type described hereinabove will be assembled onshore for each subsea well, towed out, and connected from the respective subsea well to the platform in order to produce oil or inject water.

Figure 6:
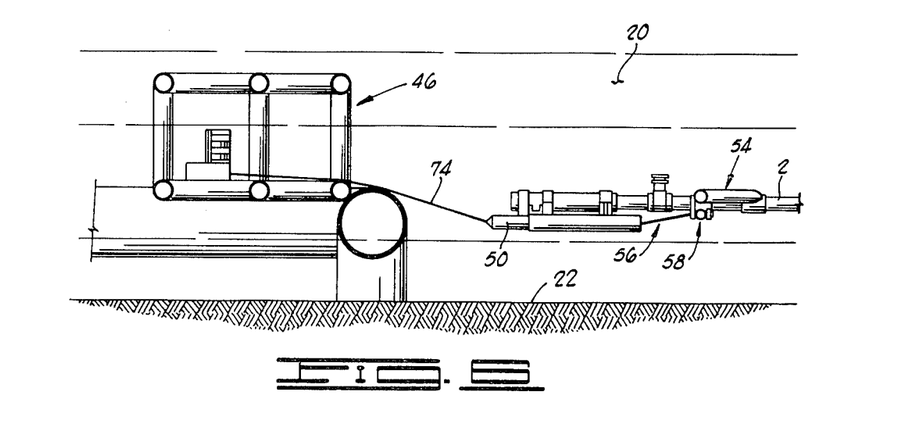
FIG. 6 is a schematic elevational view of the sled assembly, the flowline, and the apparatus of the present invention having a pull-in line connected to a subsea structure.

When the flowline bundle 2 is positioned between the points of connection, a first end of the flowline is positioned within approximately 150 feet, for example, of the subsea well. A second end of the flowline bundle is positioned within a suitable distance of the production platform. FIG. 6 shows a schematic illustration of a subsea structure 46 representing either a satellite well location or the production platform location to which the respective ends of the flowline bundle have been placed near enough so that they can be connected through the use of the subsea pull-in apparatus 18 and 19 of the present invention.

Figure 3:
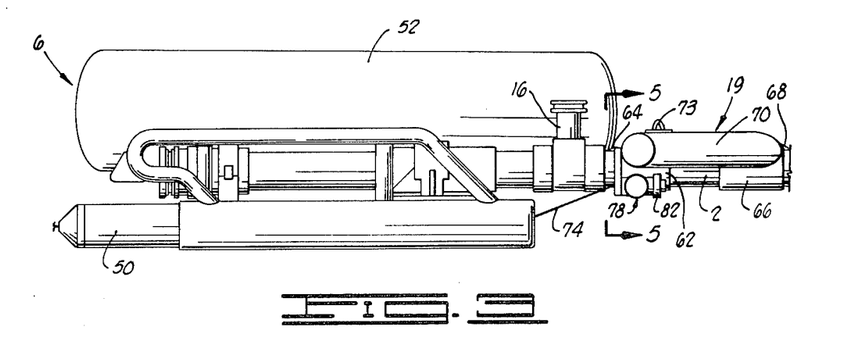
FIG. 3 is a side elevational view of the flowline connected to a flowline sled assembly and to a preferred embodiment of the apparatus of the present invention.
Figure 4:
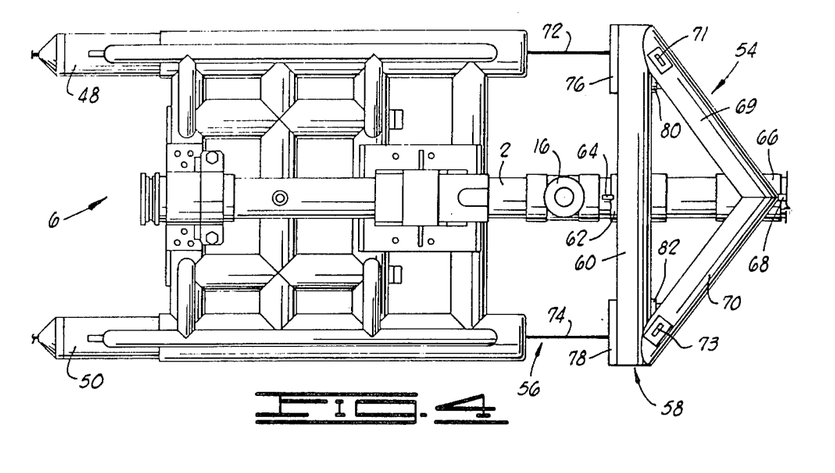
FIG. 4 is a top plan view of the embodiment shown in FIG. 3 with the flotation tanks of the sled assembly removed to allow the other components to be more clearly shown.
Figure 5:
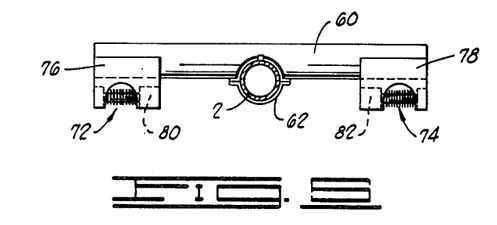
FIG. 5 is a sectional view of the flowline taken along the line 5—5 shown in FIG. 3.
Figure 7:
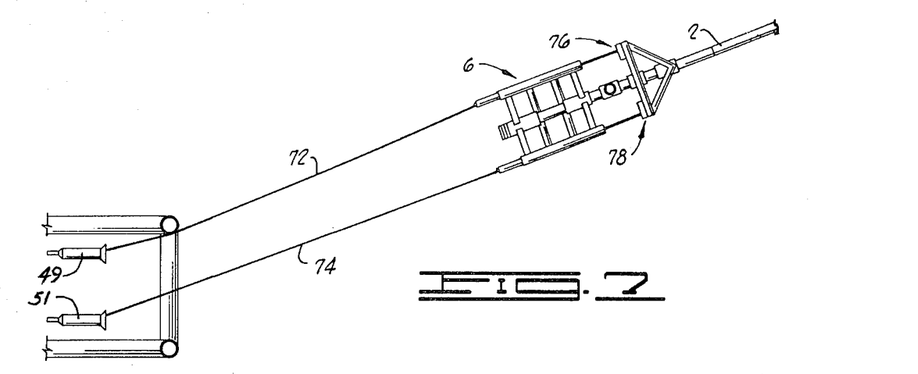
FIG. 7 is a schematic illustration of the present invention in one position of operation.
Figure 8:
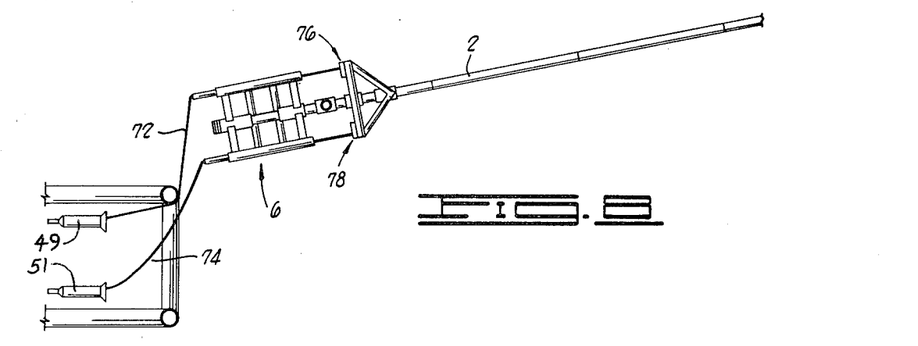
FIG. 8 is a schematic illustration of the present invention in a second position of operation.
Figures 9, 10:
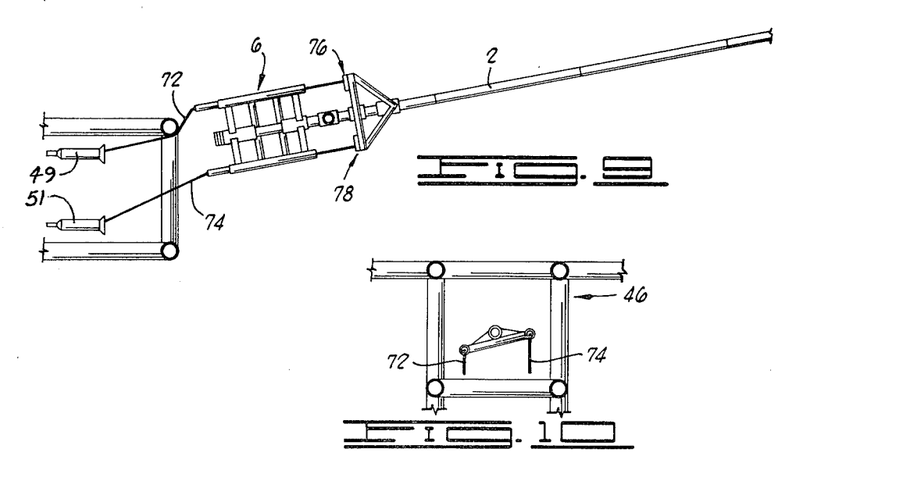
FIG. 9 is a schematic illustration of the present invention in a third position of operation.
FIG. 10 is a schematic illustration of the present invention in a fourth position of operation.

The preferred embodiment construction of the apparatus 18 and 19, which are identical in the preferred embodiment, is more particularly disclosed in FIGS. 3–5. FIGS. 3 and 4 also schematically show the trail flowline sled assembly 6 which will be briefly described. The sled assembly 6 is similar to the flowline sled assembly described in my copending patent application Ser. No. 048,316, and thus the structure described therein is incorporated herein by reference. It is to be noted that the assembly 6 is connected to the flowline 2 and includes two alignment tubes 48 and 50 which align and mate with respective receiving portions of a receiving module such as the subsea structure 46 illustrated in FIG. 6. These receiving portions are shown in FIGS. 7–9 as being first and second receiving tubes 49 and 51. The alignment tubes 48 and 50 extend substantially parallel to at least a portion of the flowline 2 in the preferred embodiment. For purposes of illustration, it will be assumed that the receiving module 46 is located at the wellhead site; however, a similar receiving module could be utilized at the production platform for operating with the present invention.

The construction of the apparatus 18 and 19 will be shown with reference to the apparatus 19 as schematically illustrated in FIGS. 3–5. The apparatus 19 is connected to the flowline 2 at a suitable distance from the sled 6. In the preferred embodiment the apparatus 19 is located approximately twenty feet from the forward end of the sled 6 or approximately five feet from the rear of buoyancy tanks, such as a buoyancy tank 52 shown in FIG. 3, mounted on the sled 6.

The apparatus 19 includes support means 54 for connecting the apparatus 19 to the flowline 2. The apparatus also includes winch lines which may generally be referred to as coupling means 56, extendable in a direction away from the flowline 2, for coupling to the subsea structure 46. Additionally, the apparatus includes winches which may generally be referred to as retracting means 58, connected to the support means 54 and thus to the flowline 2, for shortening the length of the coupling means 56 extending from the flowline 2 to the subsea structure 46 so that the flowline 2 is pulled toward the subsea structure 46 as the length is shortened.

The support means 54 is shown in FIGS. 3-5 to include a crosspiece 60 extending transversely across the flowline 2 so that approximately one-half of the crosspiece 60 extends perpendicularly on either side of the flowline 2 as measured from the center of the flowline.

The crosspiece 60 is releasably secured to the flowline 2 by suitable crosspiece retaining means. The crosspiece retaining means includes a first clamp means 62 which is connected to the crosspiece 60 by suitable means such as by welding, bolting, or the like.

The first clamp means 62 has suitable clamping jaws which can be manipulated to releasably clamp the crosspiece 60 to the flowline 2 at a suitable position therealong. To prevent the first clamp means 62 from moving relative to the flowline 2, such as by rotating circumferentially or sliding longitudinally relative thereto, the crosspiece retaining means further includes stop means.

The preferred embodiment of the stop means is illustrated in FIGS. 3 and 4 and includes a first lug 64 which is welded or otherwise appropriately connected to the outer surface of the flowline 2. The lug 64 projects radially outwardly from the flowline 2 so that it can mate with a keyed indentation formed in the first clamp means 62 when the first clamp means 62 is clamped around the flowline 2. The first lug 64 prevents the clamp means 62, and thus, the crosspiece 60 connected thereto, from rotating circumferentially with respect to the flowline 2 and prevents it from sliding longitudinally in a first direction with respect to the flowline 2. In the illustrated embodiment the first direction is toward the end of the flowline 2 which is connected to the sled assembly 6.

The stop means further includes a second clamp means 66 having clamping jaws for releasably clamping to the flowline 2 in spaced relation to the first clamp means 62. To prevent the second clamp means 66 from rotating circumferentially with respect to the flowline 2 and from sliding longitudinally in a second direction with respect to the flowline 2, the stop means further includes a second lug 68. The second direction is that direction opposite the first direction. The second lug 68 is suitably connected to the flowline 2, such as by welding or other appropriate means, and projects radially outwardly therefrom. The second lug 68 mates with a keyed indentation formed in the second clamp means 66 so that the aforementioned movement relative to the flowline 2 is prevented.

To prevent the flow clamp means 62 and the second clamp means 66 from moving toward each other and to provide further support for the device 19, the stop means further includes a first frame element 69 connected between the second clamp means 66 and a first location on the crosspiece 60. In the preferred embodiment the first frame element 69 is a metallic arm suitably connected, such as by welding or bolting, at one end to the second clamp means 66 and at a second end to a first end of the crosspiece 60. The stop means also includes a second frame element 70 which is connected between the second clamp means 66 and a second location, spaced from the first location, on the crosspiece 60. In the preferred embodiment the second frame element 70 is a metallic arm similar to the element 69 and is suitably connected at a first end to the clamp 66 adjacent the first element 69 and at a second end to a second end of the crosspiece 60. Attached to the elements 69 and 70 are retaining rings 71 and 73 to which a hoist or other equipment can be connected for moving the support means 54. This construction of the first and second frame elements 69 and 70 with the crosspiece 60 forms a triangularly shaped framework which is releasably secured to the flowline 2 by the clamp means 62 and 66.

The coupling means 56 includes a first flexible winch line 72 and a second flexible winch line 74 which in the preferred embodiment are pull-in cables constructed of stainless steel braided wire having a ⅜ inch outer diameter. This specific embodiment of the flexible line has a minimum breaking strength of approximately 15,000 pounds. Each of the flexible lines 72 and 74 has a first end which is free to be extended away from the support means 54 and from the flowline 2 for attachment to the subsea structure 46 by a suitable attachment means at the first end of each of the lines 72 and 74. In the preferred embodiment the first end of the line 72 is strung through the first alignment tube 48 and tied off in a suitable line retaining clamp (not shown) on the outside of the alignment tube 48. Similarly, the first end of the second line 74 is strung through the second alignment tube 50 and tied off at a suitable retaining means located on the outside of the alignment tube 50 or at another suitable location of the flowline sled assembly 6. Each of the flexible lines 72 and 74 has a respective second end which is associated with a respective element of the retracting means 58.

The retracting means 58 is supported by the supporting means 54 and includes a winch means for receiving the flexible line which in the preferred embodiment illustrated in the drawings includes both of the flexible lines 72 and 74. The winch means particularly includes a first rotary winch 76 connected to the first end of the crosspiece 60 for receiving the second end of the flexible line 72 so that the line 72 can be reeled onto and away from a spool or drum of the first winch means 76. The winch means also includes a second rotary winch 78 connected to the second end of the crosspiece 60 in spaced relation with the first winch 76 for receiving the second end of the flexible line 74 so that the flexible line 74 can be reeled onto and away from a spool or drum of the second winch 78. In a specific embodiment the winches 76 and 78 each includes a standard Koenig model ML-15 winch which is adapted to be mounted on the crosspiece 60.

Each of the first and second winches 76 and 78 is actuated by suitable winch drive means to permit the respective flexible lines 72 and 74 to be extracted therefrom or accumulated thereon. The actuating winch drive means operates the winch means to wind either or both of the first and second lines thereon so that when the first and second lines are connected to the subsea structure 46 the lengths of the first and second lines 72 and 74 between the first and second winches 76 and 78, respectively, and the subsea structure 46 are decreased whereby the flowline 2 is pulled toward the subsea structure 46.

The winch drive means for actuating the winch means includes a first hydraulic motor 80 having a drive mechanism suitably connected to the first winch 76 for rotating the spool or drum of the first winch 76. The actuating means also includes a second hydraulic motor 82 having a drive mechanism suitably coupled to the second winch 78 for rotating the spool or drum thereof. In a specific embodiment each of the motors 80 amd 82 includes a Sunstrand 60 series model MH-02-JC five-cylinder motor.

Each of the motors 80 and 82 is powered by suitable hydraulic drive means. In the preferred embodiment the hydraulic drive means includes a hydraulic hose bundle 84, schematically illustrated in FIGS. 11 and 12, which divers attach or join to the motors for actuating the winch means. The other end of the hydraulic hose bundle 84 is connected to a hydraulic power source located in a diving support construction vehicle 86 constructed for subsea operation. The hydraulic hose bundle 84 and the hydraulic power source are also elements of the preferred embodiment of the winch drive means. Other suitable types of motors, drive means and control lines can be used to comprise the winch drive means.

Figure 11:
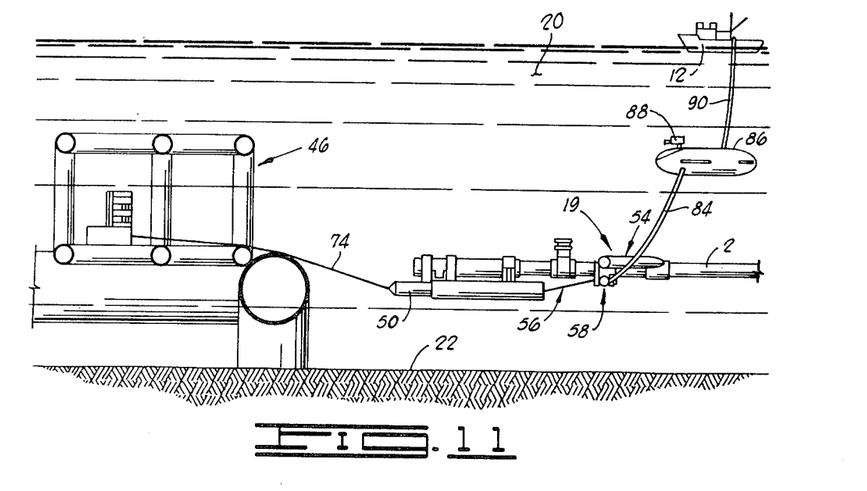
FIG. 11 is a schematic illustration of a subsea vehicle having control lines connected with a surface vessel and with the winch means of the present invention.

The diving support construction vehicle 86 is schematically shown in FIG. 11 to have a television camera 88 or other suitable image relaying means associated therewith. The television camera 88 provides a picture of the relationship between the apparatus 19 and the subsea structure 46 to a person on the surface vessel 12 so that the person can send appropriate control signals via a hydraulic bundle 90 or other suitable control line means to the vehicle 86 to which the bundle 90 is connected. These appropriate control signals are utilized in the vehicle 86 to control the power source means to properly actuate the motors 80 and 82 via the hydraulic bundle 84. In an alternative embodiment (not shown) the control lines can extend directly between the vessel 12 and the winch means, and the relationship between the apparatus 19 and the subsea structure 46 can be determined by a diver or other suitable means for observing.

Figure 12:
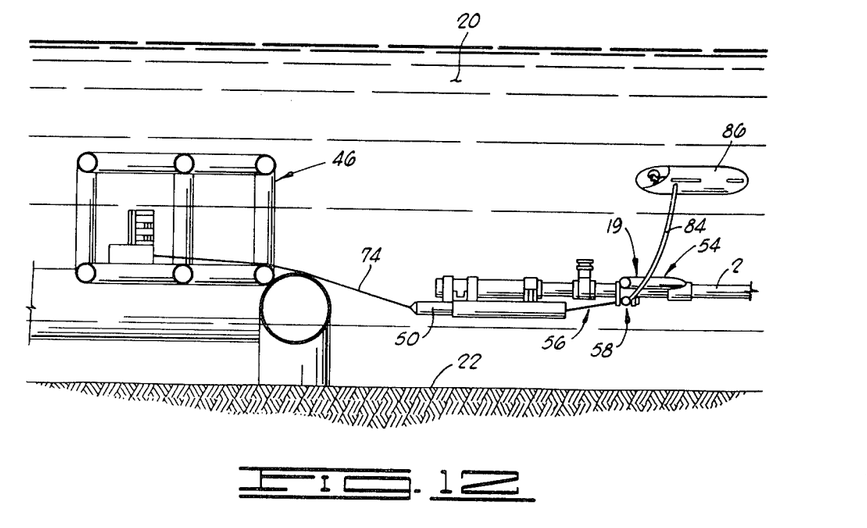
FIG. 12 is a schematic illustration of a manned subsea vehicle having control lines connected with the winch means of the present invention.

FIG. 12 schematically illustrates that another embodiment of the diving support construction vehicle 86 includes a manned submersible vessel. The person or persons manning the vehicle 86 of this embodiment observe the positioning of the flowline 2 and the apparatus 19 with respect to the subsea structure 46 and manipulate controls in the vehicle 86 to control the power source means to properly actuate the motors 80 and 82 via the control line bundle 84 so that the pull-in operation is properly performed. A diver (not shown) can be used for making the necessary observations and relaying positioning information to another in the vehicle 86. While the FIG. 11 embodiment can be affected by surface conditions, the embodiment shown in FIG. 12 is relatively unaffected by the same conditions.

Other suitable means for controlling the power source means in response to the relative position between the flowline 2 (and/or the attached apparatus 19) and the subsea structure 46, and thus the motors 80 and 82 and, more generally, the pull-in operation of the present invention, can be used.

Each of the Koenig winches to be used in the preferred embodiment weighs approximately 349 pounds and each of the Sundstrand hydraulic motors weighs approximately 65 pounds. The triangularly shaped support frame is contemplated to weigh approximately 800 pounds and to have a buoyancy of approximately 855 pounds. For these values, to make the combination of these elements neutrally buoyant, an additional buoyancy of approximately 773 pounds must be added to the assembly. Configuration chains can then be added to make the unit slightly negatively buoyant if desired.

With reference to FIGS. 6-10, the operation of the present invention will be described. The support means 54 is releasably clamped to the flowline 2 by means of the first clamp means 62 and the second clamp means 66. The jaws of the clamp means 62 and 66 are held together by a suitable latching mechanism. The clamp means 62 and 66 are held immobile relative to the flowline 2 by means of the lugs 64 and 68 (which have been previously fastened to the flowline 2) engaging the key indentations of the clamps 62 and 66, respectively.

Each of the first and second winches 76 and 78 is connected to a respective end of the crosspiece 60 of the support means 54 and each of the drums or spools of the winches has a respective one of the first and second flexible lines 72 and 74 wound thereon. Once the support means 54 is secured to the flowline 2, the flexible lines 72 and 74 are extracted or extended from the winches and strung through respective ones of the alignment tubes 48 and 50 and tied off in the cable clamps located on the outside of the tubes 48 and 50 or the sled assembly 6.

Next, the configuration or drag chains which can be used to make the unit neutrally or negatively buoyant can be added.

Once these steps have been performed, the flowline 2 having the apparatus of the present invention connected thereto will be towed by suitable means (such as is disclosed in my co-pending patent application) to a position wherein one end of the flowline 2 will be within a suitable distance (such as approximately 150 feet) of the receiving module of the subsea structure 46. With the end of the flowline 2 so positioned in the vicinity of the subsea structure, the hydraulic hose bundle 84 of the actuating means is extended from the diving support construction vessel 86 for coupling with the hydraulic motors 80 and 82 which engage the winches 76 and 78. In this manner the winch drive means is coupled to the winch means.

Next, a diver releases the first flexible line 72 from its attachment to the sled 6 and extends the flexible line 72 away from the flowline 2 through receiving tube 49 to the subsea structure 46. The end of the flexible line 72 extended from the flowline 2 is attached to the subsea structure 46. In the preferred embodiment the first end of the flexible line 72 is attached to a pennant line at the wellhead receiving module so that the flexible line 72 can be pulled through a sheeve system on the subsea structure 46. The second flexible line 74 is then extended from the flowline 2, through second receiving tube 51 and is attached to the subsea structure 46 and retracted by the second winch 78.

The flowlines 72 and/or 74 are retracted so that the flowline 2 is pulled toward the subsea structure 46. In particular, the lines 72 and/or 74 are retrieved onto the respective spools or drums of the winches 76 and 78. In the preferred embodiment the rate at which the lines 72 and/or 74 are retrieved and the flowline 2 is pulled toward the subsea structure 46 is approximately ten feet per minute. This retrieval is accomplished by coupling the winch drive means to the winch means and actuating the winch drive means so that the drum or spool of one or both of the winches rotates and accumulates the flexible line connected thereto. This retrieval process is continued until the flowline 2 and the sled assembly 6 have been pulled to a first mechanical lock position in the receiving module 46. Once the flowline 2 is in the first mechanical lock position, the hydraulic hose bundle 84 of the winch drive means is uncoupled from the winch means and transferred to the receiving module for final connection and securement of the sled assembly 6 and flowline 2.

With the securement of the sled and flowline, the first ends of the flexible lines 72 and 74 are detached from the subsea structure 46 and the support means 54 is unclamped from the flowline 2 so that the apparatus of the present invention can be re-used on another flowline.

FIGS. 7-10 illustrate different positions of the flowline 2 and sled assembly 6 as they are pulled toward the subsea structure 46 by means of the present invention. Because of the translations and rotations which the flowline and sled assembly can go through relative to the subsea structure 46, the two flexible lines 72 and 74 are needed in these illustrated positions to align the sled assembly 6 so that the alignment tubes 48 and 50 can suitably dock with the receiving module of the subsea structure 46. For example, in FIG. 8 the second hydraulic motor 82 can be actuated to accumulate or retrieve the second flexible line 74 at a rate faster than the first winch 76 accumulates the first flexible line 72 so that the alignment between the sled 6 and the receiving module of the subsea structure 46 will be corrected.

Another position of the sled 6 relative to the subsea structure 46 is illustrated in FIG. 9. This position shows the sled 6 coming into alignment in response to the aforementioned correction.

FIG. 10 illustrates an example of the correction which can be accomplished to compensate for rotation of the sled 6. By pulling on the second flexible line 74 at a faster rate than on the first flexible line 72, one can compensate for the illustrated misalignment due to the rotation.

The appropriate correction to be made is determined by one or more persons observing the pull-in operation and properly controlling the actuation of the motors 80 and 82. This observation and control is achieved in the preferred embodiments by means of the elements schematically shown in FIGS. 11 and 12 and described hereinabove.

This system therefore provides a means for correcting both translational and rotational misalignment between the flowline 2 and the subsea structure 46.

FIGS. 7-9 illustrate correction of a translational misalignment in a horizontal direction. Such a misalignment might be caused, for example, by a lateral current. Similarly, a translational misalignment in a vertical direction is corrected by pulling upward or downward on the flowline.

FIG. 10 illustrates correction of a rotational misalignment about a longitudinal axis of the flowline. Also, there can be a rotational misalignment about a vertical axis, such as is seen in FIGS. 7-9. That rotational misalignment is corrected by pulling faster on second line 74 as the sled assembly 6 is pulled into the subsea structure 46.

It will be understood that all of these translational and rotational misalignments may be corrected with the present invention by varying the relative rates of retrieval of lines 72 and 74. This includes the possibility of retrieving only one of the lines 72 or 74 for a period of time while the other line remains stationary.

ALTERNATIVE EMBODIMENT

Figure 13:
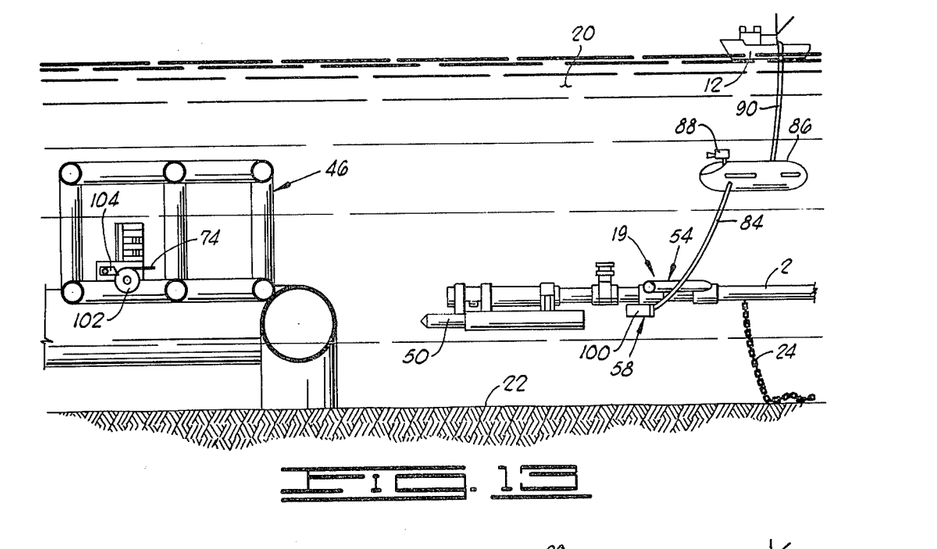
FIG. 13 is a schematic illustration of an alternative embodiment of the present invention utilizing linear winches attached to the flowline, and having the winch line initially stored on a spool on the subsea structure.
Figure 14:
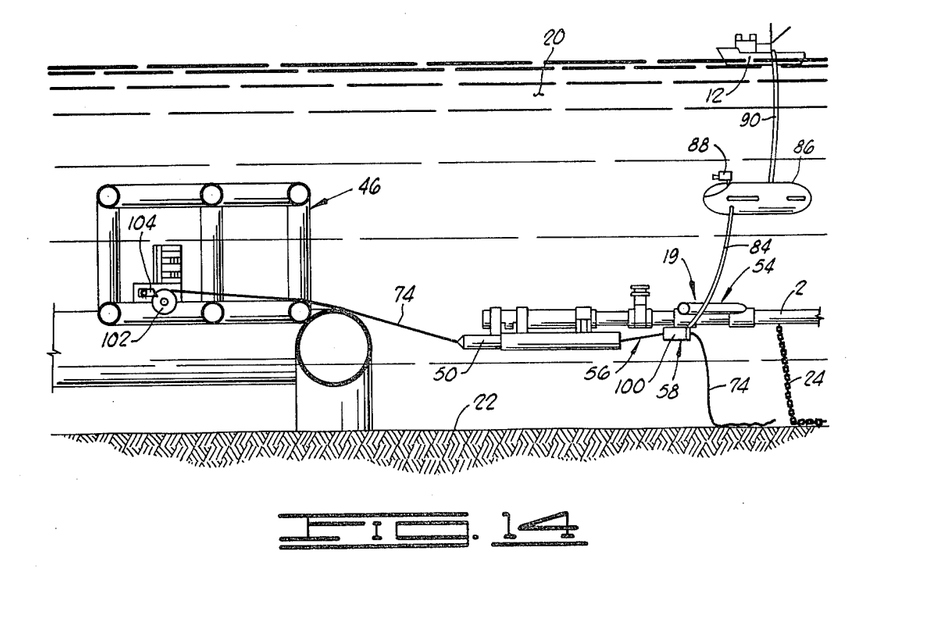
FIG. 14 is a view similar to FIG. 13, showing the winch line attached to the linear winch and showing line which has been retrieved lying on the ocean floor behind the linear winch.

FIGS. 13 and 14 illustrate an alternative embodiment wherein the rotary winches 76 and 78 are replaced by linear winches such as 100. The winch lines 72 and 74 are in turn initially stored on spools such as 102 located on subsea structure 46.

Linear winches like 100 are known to the art and provide a hand-over-hand type retrieval of the winch line 74. The winch line 74 is not stored on the linear winch 100, but rather is layed on the ocean floor 22 behind the linear winch 100 as it is retrieved.

FIG. 13 illustrates the positions of the components of the system when the flowline 2 has been towed into place and positioned near subsea structure 46 with flowline 2 floating above bottom 22 with chains 24 engaging bottom 22.

Then the lines 72 and 74 are taken from the reels 102 and placed through receiving tubes 49 and 51 and alignment tubes 48 and 50 (see FIGS. 7-9) and then connected to linear winches 100. The spools 102 are then locked against rotation by a suitable lock 104. The lines are then retrieved by the linear winches and layed on the ocean floor behind the winches.

The advantage of the alternative embodiment of FIGS. 13 and 14 as compared to the use of rotary winches is that linear winches which do not store the winch line thereon are much lighter in weight than rotary winches having the winch line stored thereon.

Thus, the present invention is well adapted to carry out the objects and attain the ends and advantages mentioned above as well as those inherent therein. While preferred embodiments of the present invention have been described for the purpose of this disclosure, numerous changes in the construction and arrangement of parts can be made by those skilled in the art which changes are encompassed within the spirit of this invention as defined by the appended claims.

I claim:

1. A method connecting a flowline to a subsea structure, said method comprising:
   constructing said flowline to have a positive buoyancy and attaching to said flowline a plurality of downwardly depending weight means so that said flow line with said weight means is neutrally buoyant at a position above an ocean floor with said weight means engaging said ocean floor;
   attaching first and second winches to a single end of said flow line;
   providing on said end of said flowline first and second substantially horizontal alignment tubes;
   providing on said subsea structure first and second substantially horizontal receiving tubes for receiving said first and second alignment tubes, respectively;
   towing said flow line to an offshore site and placing said end of said flowline in a vicinity of said subsea structure with said end of said flowline positioned above said ocean floor with said weight means engaging said ocean floor;
   connecting first and second winch lines between said subsea structure and said first and second winches, respectively by placing said first winch line through said first receiving tube and said first alignment tube and placing said second winch line through said second receiving tube and said second alignment tube; and
   retrieving said first and second winch line with said first and second winches, thereby pulling said first and second alignment tubes into said first and second receiving tubes, respectively and said end of said flowline substantially horizontally into an engagement with said subsea structure.

2. The method of claim 1, further comprising:
varying relative rates of retrieval of said first and second winch lines in response to misalignment of said alignment tubes with said receiving tubes and thereby correcting said misalignment.

3. The method of claim 2, wherein:
said misalignment is rotational.

4. The method of claim 3, wherein:
said misalignment is also translational in a direction perpendicular to said longitudinal axis of said flowline.

5. The method of claim 4, wherein:
said translational misalignment includes a horizontal component.

6. The method of claim 4, wherein:
said translational misalignment includes a vertical component.

7. The method of claim 2, wherein:
said misalignment is translational in a direction perpendicular to a longitudinal axis of said flowline.

8. The method of claim 1, wherein:
said step of attaching first and second winches is further characterized as attaching first and second rotary winches to said end of said flowline, said rotary winches having said first and second winch lines stored thereon; and
said connecting step includes steps of extending said first winch line from said first rotary winch through said first alignment tube and then through said first receiving tube, and extending said second winch line from said second rotary winch through said second alignment tube and then through said second receiving tube.

9. The method of claim 1, wherein:
said step of attaching first and second winches is further characterized as attaching first and second linear winches to said end of said flowline; and
said connecting step includes steps of:
storing said first and second winch lines on said subsea structure;
extending said first winch line from said subsea structure through said first receiving tube then through said first alignment tube, and then connecting said first winch line to said first linear winch; and
extending said second winch line from said subsea structure through said second receiving tube then through said second alignment tube, and then connecting said second winch line to said second linear winch.

10. The method of claim 9, wherein:
said retrieving step is further characterized as retrieving said first and second winch lines with said first and second linear winches and laying said first and second winch lines on said ocean floor behind said first and second linear winches as said first and second winch lines are retrieved.

11. The method of claim 1, wherein:
said step of attaching said first and second winches to said end of said flowline is performed prior to said towing step.

12. The method of claim 1, further comprising:
detaching said first and second winches from said flowline after said flowline is engaged with said subsea structure, so that said first and second winches may be retrieved and reused.

13. The method of claim 1, further comprising:
providing a power source for said first and second winches separate from said flowline;
connecting control line means between said power source and said winches; and
controlling said power source in response to a position of said flowline relative to said subsea structure to retrieve said first and second winch lines so that said end of said flowline is pulled into engagement with said subsea structure.

14. The method of claim 13, wherein:
said power source is located on a subsea vehicle.

15. A system for connecting a flowline assembly to a subsea structure, comprising:
a flowline having a positive buoyancy and having a plurality of downwardly depnding weight means attached thereto so that said flowline with said weight means is neutrally buoyant at a position above an ocean floor with a weight means engaging said ocean floor;
first and second substantially horizontal alignment tubes attached an end of said flowline, said end being adapted for engagement with said subsea structure;
first and second substantially horizontal receiving tubes attached to said subsea structure for receiving said first and second alignment tubes, respectively;
first and second winches attached to said end of said flowline; and
first and second winch lines adapted to be disposed through said first and second alignment tubes and said first and second receiving tubes, respectively and to be connected between said first and second winches, respectively and said subsea structure.

16. The system of claim 15, wherein:
each said winch is a rotary winch having each said winch line stored thereon.

17. The system of claim 15, wherein:
each said winch is a linear winch; and
each said system further comprises means for initially storing each said winch line on said subsea structure.

18. The system of claim 15, further comprising:
means for varying relative rates of retrieval of said first and second winch lines in response to misalignment of said alignment tubes with said receiving tubes and for thereby correcting said misalignment.

19. The system of claim 18, wherein:
said means for varying relative states of retrieval of said first and second winch lines is further characterized as a means for varying both translational and rotational misalignment.

20. The system of claim 15, further comprising:
a power source for said first and second winches separate from said flowline;
control line means connecting said power source and said first and second winches; and
control means for controlling said power source in response to a position of said flowline relative to said subsea structure and for thereby retrieving said first and second winch lines so that said end of said flowline is pulled into engagement with said subsea structure.

21. The system of claim 20, wherein:
said power source is located on a subsea vehicle.

* * * * *